E. GASE.
FLOUR SIFTER.
APPLICATION FILED OCT. 25, 1920.
1,379,550.
Patented May 24, 1921.
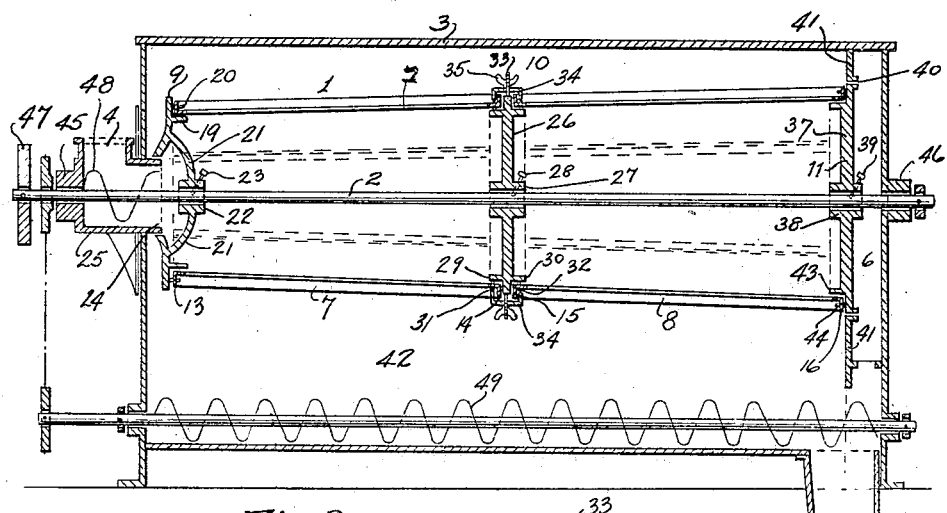
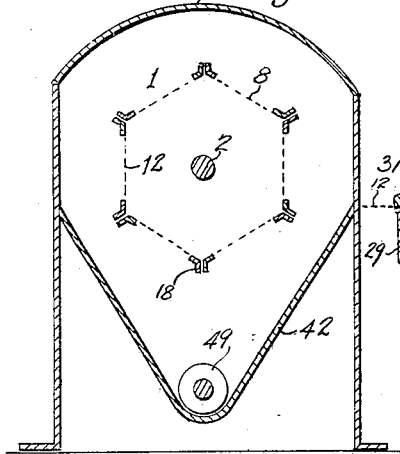
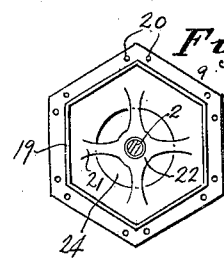
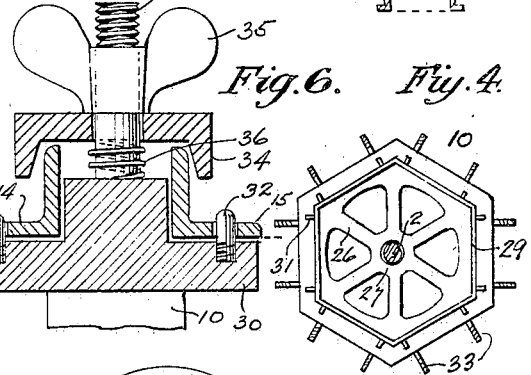
INVENTOR
Eugene Gase

UNITED STATES PATENT OFFICE.

EUGENE GASE, OF SAGINAW, MICHIGAN, ASSIGNOR TO BAKER-PERKINS MANUFACTURING CORPORATION, OF SAGINAW, MICHIGAN.

FLOUR-SIFTER.

1,379,550.  Specification of Letters Patent.  Patented May 24, 1921.

Application filed October 25, 1920. Serial No. 419,497.

*To all whom it may concern:*

Be it known that I, EUGENE GASE, a citizen of the United States, residing at Saginaw, in the county of Saginaw and State of Michigan, have invented new and useful Improvements in Flour-Sifters, of which the following is a specification.

My invention relates to improvements in rotary sifters intended to separate fine flour and like pulverized substances from coarser particles and extraneous matters, and has for its object to facilitate and accelerate this operation and to make it more efficient and economical in every way.

To this end I construct the sifting reel as a truncated—preferably hexagonal—pyramid the sides of which consist of exchangeable sieves removably fixed to the rim of spider wheels rigidly mounted on a rotary shaft arranged coaxially to the pyramid, the material to be sifted entering at the smaller end, and the waste residue leaving at the larger end of the reel.

The novel features, arrangements, parts and combinations thereof which constitute my invention, are shown in the accompanying drawings representing by way of example a reel intended for sifting in baking establishments large quantities of flour in as short a time as possible, and are fully explained in the following description.

The pyramidal reel shown is hexagonal, and its sides are carried by three spider wheels, one at each end and one in its middle part.

Figure 1 is a longitudinal section of the whole sifting machine, and Fig. 2 is a transverse section taken on line 2—2 of Fig. 1; Fig. 3, Fig. 4, and Fig. 5 show side views of the three spider wheels carrying the various sieves, and Fig. 6 represents an enlarged sectional view of the connection of the sieves to the middle spider wheel.

The reference numeral 1 indicates the reel, 2 the rotary shaft, 3 the housing in which the operation takes place, 4 the inlet for the flour to be sifted, 5 the outlet for the sifted material and 6 the chamber in which the residue, which did not pass through the sieves, collects. The reel 1 consists of six smaller sieves 7 and six larger sieves 8, one smaller sieve and one larger one forming together one side of the truncated pyramid. The shorter ends of the sieves 7 are carried by the spider wheel 9, the larger ends of the sieves 7 and the shorter ends of the sieves 8 by the spider wheel 10, and the larger ends of the sieves 8 by the spider wheel 11. The single sieves consist of angle iron frames to which the sifting cloth 12, usually brass gauze, is soldered or fixed in any other suitable way. The angle irons 13 and 14 at the ends of the sieves 7 and the angle irons 15 and 16 at the ends of the sieves 8 are rectangular, while the angle irons at their slanting sides, 17 at the sieves 7 and 18 at the sieves 8, are obtuse to such a degree, that, when the sieves are attached to the spiders, the upright parts of such angle irons placed alongside each other are in touch throughout their whole length and width, and that those parts, to which the sifting cloth 12 is attached forming an even plane therewith, constitute the corners of the pyramid, as shown in Fig. 2. The spider wheel 9, the smallest one, is hexagonal in circumference and curved in its middle part, the straight rim having the same inclination to the horizontal as the upright parts of the angle irons 13, when their sieves 7 are in position for forming the anterior part of the reel 1; at the lower part of the rim bracketlike projections 19 form a hexagon the sides of which are equal in length to the angle iron 13 and serve to support the shorter ends of the sieves 7, which are kept in position by means of the studs 20, fixed in the rim of the wheel 19 and fitting in corresponding holes arranged in the uprights of the angle irons 13. The convex middle part of the wheel 9 is provided with four suitably curved arms 21 ending in the hub 22 fixed to the shaft 2 by means of the screw 23, and with the circular opening 24 corresponding to the circular tube 25 of the inlet 4. When in its proper position on the shaft 2, the concave part of the wheel 9 points inside the reel 1, and the circular opening 24, the edge of which may be broadened out, surrounds the tube 25 in such a manner that, while not impeding in any way the free circulation of the wheel 9, it yet prevents particles of the unsifted flour fed into the reel 1 through the tube 25 from escaping therefrom into the housing 3.

The spider wheel 10, the middle one in position and size, is also hexagonal and has six straight spokes 26 ending in the hub 27 rigidly attached to the shaft 2 by means of the screw 28. The rim of the wheel 8 is provided with two hexagonal brackets, one at each side, the bracket 29, the sides of which are equal in length to the angle irons 14, supporting the longer ends of the sieves 7, and the bracket 30, the sides of which are equal in length to the angle irons 15, carrying the shorter ends of the sieves 8. In order to prevent any possible sidewise movements of the sieves 7 and 8, studs provided in these brackets are passed through corresponding holes arranged in the sieve frames; the studs 31 on the brackets 29 correspond to holes in the flat sides of the angle irons 14, and the studs 32 in the brackets 30 to holes in the angle irons 15. The edge of the rim of the wheel 10 is arranged to be lower than the tops of the angle irons 14 and 15, when their sieves 7 and 8 are in the proper position on the brackets 29 and 30 respectively, and is provided with screw studs 33; the clamps 34 are placed over these studs 33 through corresponding openings therein and pressed down by means of the thumb screw nuts 35, the pressure being preferably controlled by the springs 36. (See Fig. 6.) In this way the sieves 7 and 8 are fastened and locked unto the wheel 10, forming the mainstay of the reel.

The spider wheel 11 has six straight spokes 37 ending in the hub 38 fixed to the shaft 2 by means of the screw bolt 39, and is circular in circumference which corresponds to the opening 40 in the partition wall 41 between the waste chamber 6 and the main part of the housing 3 containing the hopper 42, in which the fine flour sifted through reel 1 collects; the rim of the wheel 11 and the opening 40 may be provided with broadened edges and are so arranged that, while the wheel 11 freely rotates therein, fine sifted flour is prevented from entering into the chamber 6, and waste flour and impurities from penetrating from the latter into the main part of the housing 3. The rim of the wheel 11 is provided—like that of the two other wheels—with brackets 43 arranged to form a hexagon, each side of which is equal in length to the angle irons 16, which rest thereon and are kept in position by the studs 44, fixed in the rim of the wheel 11 and passing through corresponding openings in the angle irons 16. For assembling the reel, the spider wheels 9, 10 and 11 are fixed to the shaft 2 so that the hexagonal brackets 19, 29, 30 and 43 are perfectly in line, and that the distance between the wheels 9 and 10 conforms to the length of the sieves 7, and that between 10 and 11 to the length of the sieves 8. A single sieve 7 is then placed on a bracket 19, pushed against the rim of the wheel 9 over the studs 20 and then let down on the corresponding bracket 29 of the wheel 10 over the studs 31; a sieve 8 forming together with the sieve 7, just put in position, one side of the reel 1 is arranged in the same manner on the brackets 30 of wheel 10 and 43 of wheel 11 and held thereon by the studs 32 and 44 respectively; the clamps 34 are then screwed down on the angle irons 14 and 15; after every corresponding pair of the sieves 7 and 8 has been fixed in the same manner, the reel 1, is complete and ready for work. After simply unscrewing thumb nuts 35 the sieves 7 and 8 can be lifted from their seats and replaced by other ones, the sifting cloth of which has a different number of openings per square inch.

The shaft 2 is supported by the bearings 45, arranged at the front part of the feeding tube 25, and 46, fixed to the outer wall of the chamber 6, and rotated by means of the driving wheel 47. For rendering the flow of the flour to be sifted in the reel 1 regular, the feeding tube is provided with the short screw conveyer 48 fixed to the shaft 2. The half circular channel like bottom of the hopper contains the screw conveyer 49 for moving the fine flour sifted through reel 1 to the outlet 5; the power for driving the conveyer is transmitted from the shaft 2 by sprocket wheels and chain in the ordinary manner.

I claim:

1. In a rotary flour sifter, in combination with removable sieves consisting of sifting cloth fixed to iron frames shaped to form a reel of truncated-pyramidal shape, of a driving shaft coaxial to the said reel, of three spider wheels fixed to the said shaft, one for each end and one for the middle-portion of the said reel, of hexagonal brackets provided at the rims of the said spider wheels and so constructed and arranged as to support the said sieves for forming the said reel, of means provided in the rim of the said two end spider wheels for keeping the outer ends of the said sieves, when pushed against the same, in position on the said brackets, and of means mounted on the rim of the said middle spider wheel for locking the said sieves securely in their position on the said brackets.

2. In a rotary flour sifter, in combination with removable sieves consisting of sifting cloth fixed to angle-iron frames shaped to form a reel of truncated-pyramidal shape, of a driving shaft coaxial to the said reel, of three spider wheels fixed to the said shaft, one for each end and one for the middle portion of the said reel, of single hexagonal brackets provided at the rims of the said end spider wheels for supporting the outer ends of the said sieves so as to form the ends of the said reel, of studs fixed above the said brackets sidewise in the rims of the said end spider wheels, and corresponding holes provided in the uprights forming the outer ends of the angle-iron frames of the said sieves, the said studs and the said holes keeping the latter in position on the said brackets, of two hexagonal brackets provided one at each side of the said middle spider wheel for supporting the inner ends of the said sieves so as thus to complete the said reel, of screw studs radially mounted on the rim of the said middle spider wheel, of clamps provided with openings for the said screw studs freely to pass through, and of thumb screw nuts meshing with the latter, the said screw studs, clamps and nuts being so constructed and arranged, that, when the said nuts are turned on the said studs against the said clamps, the latter press and fasten the inner ends of the said sieves onto the corresponding brackets of the said middle spider wheel, thus locking all the said sieves in their proper position to form the said reel.

EUGENE GASE.